(12) United States Patent
McNally

(10) Patent No.: US 6,206,676 B1
(45) Date of Patent: Mar. 27, 2001

(54) ELECTRIC/PNEUMATIC RIM PRESS

(75) Inventor: Douglas J. McNally, Chatham (CA)

(73) Assignee: Konal Engineering & Equipment Inc., Blenheim (CA)

( * ) Notice: Subject to any disclaimer, the term of this patent is extended or adjusted under 35 U.S.C. 154(b) by 0 days.

(21) Appl. No.: 09/177,329

(22) Filed: Oct. 22, 1998

(51) Int. Cl.$^7$ .................................................. B29L 3/00
(52) U.S. Cl. ..................... 425/214; 425/409; 425/451.7; 425/453
(58) Field of Search ................................. 425/214, 405.1, 425/406, 409, 443, 450.1, 451.7, 453, 585, 589, 595

(56) References Cited

U.S. PATENT DOCUMENTS

| | | | |
|---|---|---|---|
| 3,940,930 | * 3/1976 | Rosander | 60/375 |
| 4,231,556 | 11/1980 | Heffner et al. | 269/22 |
| 4,533,304 | 8/1985 | Amano et al. | 425/32 |
| 4,708,625 | * 11/1987 | Arend | 425/589 |
| 4,944,669 | 7/1990 | Zakich | 425/589 |
| 5,044,919 | 9/1991 | Hama et al. | 425/443 |
| 5,091,124 | 2/1992 | Zakich | 264/40.1 |
| 5,261,810 | 11/1993 | Kamp et al. | 425/451.9 |
| 5,282,732 | 2/1994 | Eggert | 425/153 |
| 5,302,109 | * 4/1994 | Glaesener et al. | 425/595 |
| 5,378,140 | * 1/1995 | Asano et al. | 425/451.2 |
| 5,741,528 | 4/1998 | Amano et al. | 425/29 |
| 5,811,139 | 9/1998 | Hehl | 425/590 |
| 5,879,726 | 3/1999 | Hsing | 425/451.2 |

FOREIGN PATENT DOCUMENTS

| | | |
|---|---|---|
| 1 310 796 | 12/1999 | (CA) . |
| 0 221 872 A2 | 5/1987 | (EP) . |
| 0 245 517A1 | 11/1987 | (EP) . |
| 0 271 588A1 | 6/1988 | (EP) . |
| 0 285 046A2 | 10/1988 | (EP) . |
| 0 585 120A1 | 3/1994 | (EP) . |
| 0 589 050A1 | 3/1994 | (EP) . |
| 585 120 | 3/1994 | (EP) . |
| 507 963 | 8/1996 | (EP) . |
| 1 055 213 | 3/1989 | (JP) . |
| 5 345 339 | 12/1993 | (JP) . |

OTHER PUBLICATIONS

Specification (37 pp.), claims (11 pp.) and drawings (16 sheets) from Application Ser. No. 09/041 068, filed Mar. 12, 1998.

* cited by examiner

Primary Examiner—Harold Pyon
Assistant Examiner—Donald Heckenberg
(74) Attorney, Agent, or Firm—Flynn, Thiel, Boutell & Tanis, P.C.

(57) ABSTRACT

A press arrangement having ball-screw drive units for providing rapid opening and closing movement of the press, and having a pneumatic closure arrangement for providing a final small-stroke closing movement and holding force for the mold. The pneumatic closure arrangement acts through the mold to cause the ball-screw drive units to be axially displaced a small amount sufficient to cause automatic engagement of a friction brake which nonrotatably holds the screw shaft to prevent back driving thereof due to the mold closure force.

23 Claims, 6 Drawing Sheets

ELECTRIC/PNEUMATIC RIM PRESS

FIELD OF THE INVENTION

This invention relates to a press system for forming plastic parts, such as urethane parts, and more particularly relates to an improved press which utilizes a ball-screw driving arrangement for high-speed closure of the press and an air pressure arrangement for holding the press closed. The press also incorporates a brake which is automatically applied when molds associated with the opposed press platens are loaded so as to prevent back driving of the ball-screw drive arrangement.

BACKGROUND OF THE INVENTION

Copending application Ser. No. 09/041 068, owned by the Assignee hereof, illustrates therein a press arrangement which is particularly desirable for permitting molding of large plastic parts, such as urethane parts. The press arrangement of the aforesaid application incorporates ball-screw drive shaft arrangements for effecting relative opening and closing movement of the opposed mold bearing press platens. The drive arrangements of this press have proven highly desirable with respect to the performance they provide, and are particularly desirable where the press is mounted on a mobile carrier, such as an overhead support track, since the press does not have to rely on the use of hydraulic actuators and the like for the major performance functions carried out thereby. In the aforementioned press, the ball-screw drive actuators are controlled by both high speed and low speed drives which react with at least one of the press platens to provide rapid opening and closing movement of the press platen, and provide for slow movement throughout a small stroke which exists at the time the opposed mold parts are being moved into a closed relationship. This arrangement, in conjunction with the brakes associated with the drive motors for the screw shafts, provides the desired control over the press platens.

The press arrangement of the aforesaid application has proven highly desirable, but nevertheless in some situations the press is of a more sophisticated and complex construction than is necessary or desired.

In other known rim presses, the final closure of the mold has often been accomplished using fluid pressure devices such as air bags or the like. In these known presses, however, the final closure stroke has generally been large (i.e., three-fourths inch or greater), and this has imposed limitations with respect to adapting the press to different tool sizes, and limitations due to the required structure of the air bag and the required large quantity of pressurized air. This press construction also encourages users to insert spacers into the press to minimize the stroke and increase the closure force, but this can often cause damage to the tool (i.e., mold).

Accordingly it is an object of this invention to provide an improved press arrangement which, while it utilizes ball-screw drive units for providing rapid but desirable control over the primary opening and closing movement of the press, it in addition is provided with a pneumatic closure arrangement which provides the final small-stroke closing movement and holding force for the mold, whereby the overall press arrangement is mechanically simplified, and such press arrangement is equally usable either when mounted on a mobile overhead carrier or when provided in association with a stationary floor-supported frame.

In the improved press arrangement of this invention, the ball-screw drive arrangements are activated to permit rapid movement of one of the press platens (the upper press platen in the illustrated embodiment) during the basic opening and closing movements of the press. When substantially in a closed position, that is in a position which is closely adjacent but spaced from a fully closed position by only a very small distance, then full closure between the mold parts is effected by a mold displacing arrangement such as an air pressure lifting device associated with one of the press platens (the lower press platen in the illustrated embodiment) to effect full closure of the mold and holding of the mold in the closed position during the molding operation. The activation of the mold displacing arrangement also acts through the mold to cause the ball-screw drive arrangement to be axially displaced a small amount sufficient to cause automatic engagement of a friction brake which effectively nonrotatably holds the screw shaft to prevent back driving thereof due to the mold closure force, whereby separate latching of the upper press platen is not required. The friction brake automatically disengages when the mold closing force is released.

In the improved press arrangement of this invention, as aforesaid, the upper and lower press platens are preferably respectively provided with booking plates which mount the mold halves thereon, and which are each preferably supported in such fashion as to permit the booking plates to be pivotally moved so as to face sidewardly, preferably toward opposite sides of the press, to facilitate access to the mold halves mounted thereon. In the preferred and illustrated embodiment, the lower booking plate and the lower press platen in its entirety is vertically swingable through a limited extent about a horizontal pivot axis to permit sideward tilting of the lower press platen to facilitate access to the lower mold half.

The improved press arrangement of this invention, as aforesaid, also includes, as an option thereon, preferably on the lower press platen, a release mechanism which acts in opposition to the mold displacing arrangement so as to facilitate cracking (i.e., initial opening) of the mold in the event that deactivation of the mold displacing arrangement is inadequate to effect mold separation.

The improved press, as aforesaid, also permits a short-stroke, high-force closure of the mold by a pneumatic device which can be maintained of simple construction and function.

Other objects and purposes of the invention will be apparent to persons familiar with constructions of this general type upon reading the following specification and inspecting the accompanying drawings.

Figure 1:
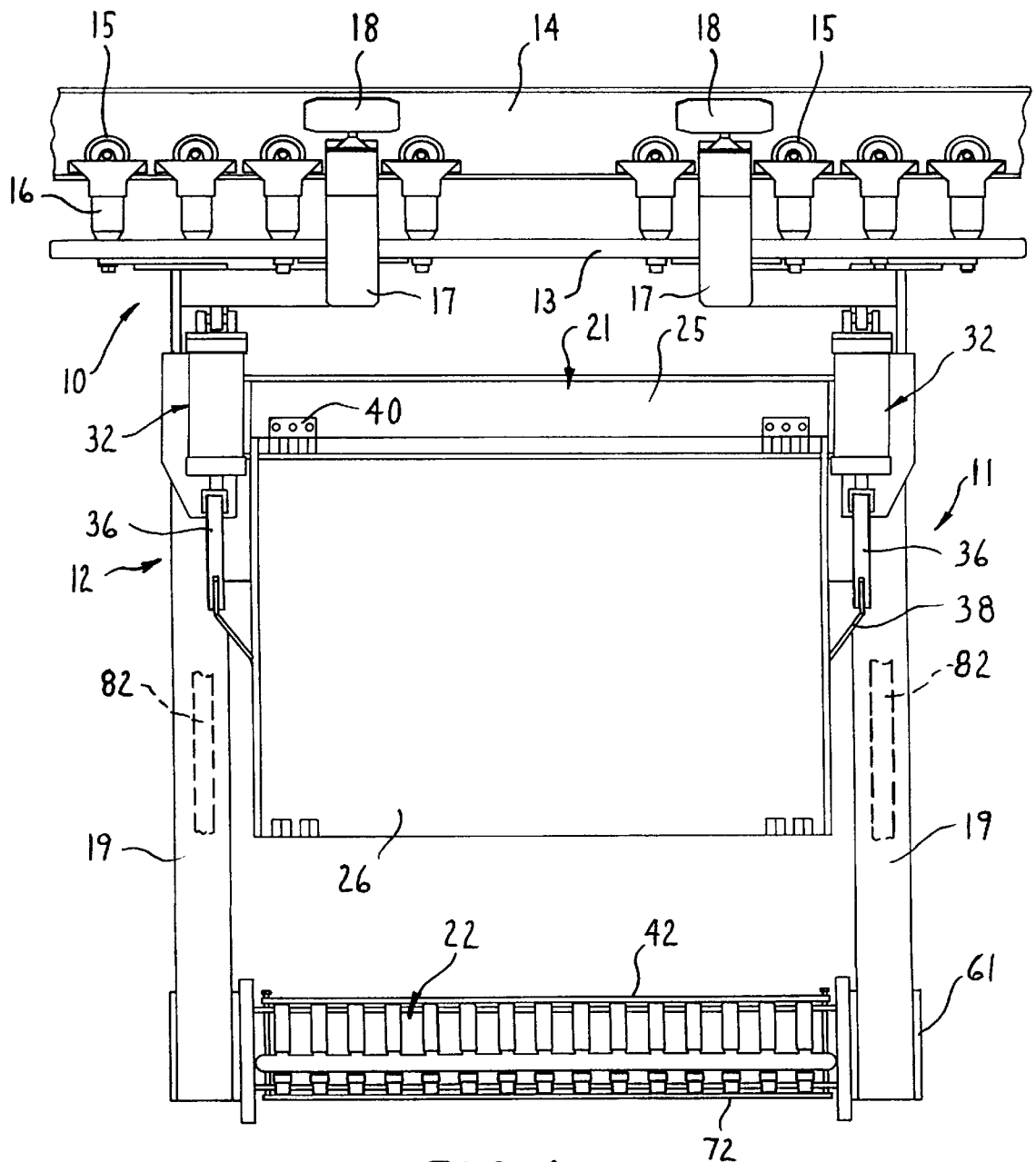
FIG. 1 is a side elevational view of a press arrangement according to the present invention and illustrating the upper press platen in an open position, and with the booking plate of the upper press platen tilted sidewardly into its access position.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

Referring to the drawings there is illustrated a carrier 10 provided with a press arrangement 11 according to the present invention. The carrier includes a frame structure 12 having, as a part thereof, a top frame 13 which is movably supported under a pair of overhead support rails 14. The support rails 14 are typically positioned in upwardly spaced relation from a floor, such as adjacent a ceiling, and typically define a closed loop so that a plurality of like carriers can be moved along a closed path into a plurality of workstations defined along the path.

In the illustrated embodiment, the top frame 13 is provided with a plurality of support rollers 15 mounted on upwardly projecting yokes 16, which rollers engage the overhead rails 14 to permit the carrier to be rollingly suspended therefrom. The top frame also mounts thereon one or more drive motors 17, typically electric drive motors, which rotate one or more drive rollers 18 which are disposed in driving engagement with the overhead rails.

The frame structure 12 also includes a pair of end frames 19 which, in the illustrated embodiment, are fixed to the top frame 13 adjacent opposite longitudinal ends thereof, and project vertically downwardly in generally parallel but spaced relation. These end frames 19 resemble vertically elongate posts or columns and, in the illustrated embodiment, are defined by structural elements such as I-beams.

The press arrangement 11 as provided on the carrier 10 is preferably of the type which is often referred to as a rim press, and as such is used for forming parts which are least partially molded of a plastics material such a polyurethane, which parts are typically rather large in size and may comprise parts such as interior door panels for vehicles and the like. The press arrangement 11 includes an upper or top press structure or platen 21 which in the preferred embodiment is vertically movably supported on and between the end frames 19, and a lower or bottom press structure or platen 22 which is supported on and between the lower ends of the end frames 19. The top press structure 21 is vertically slidably guided on guides or gibs 20 which are fixed to and project vertically along the frame posts 19.

Figure 4:
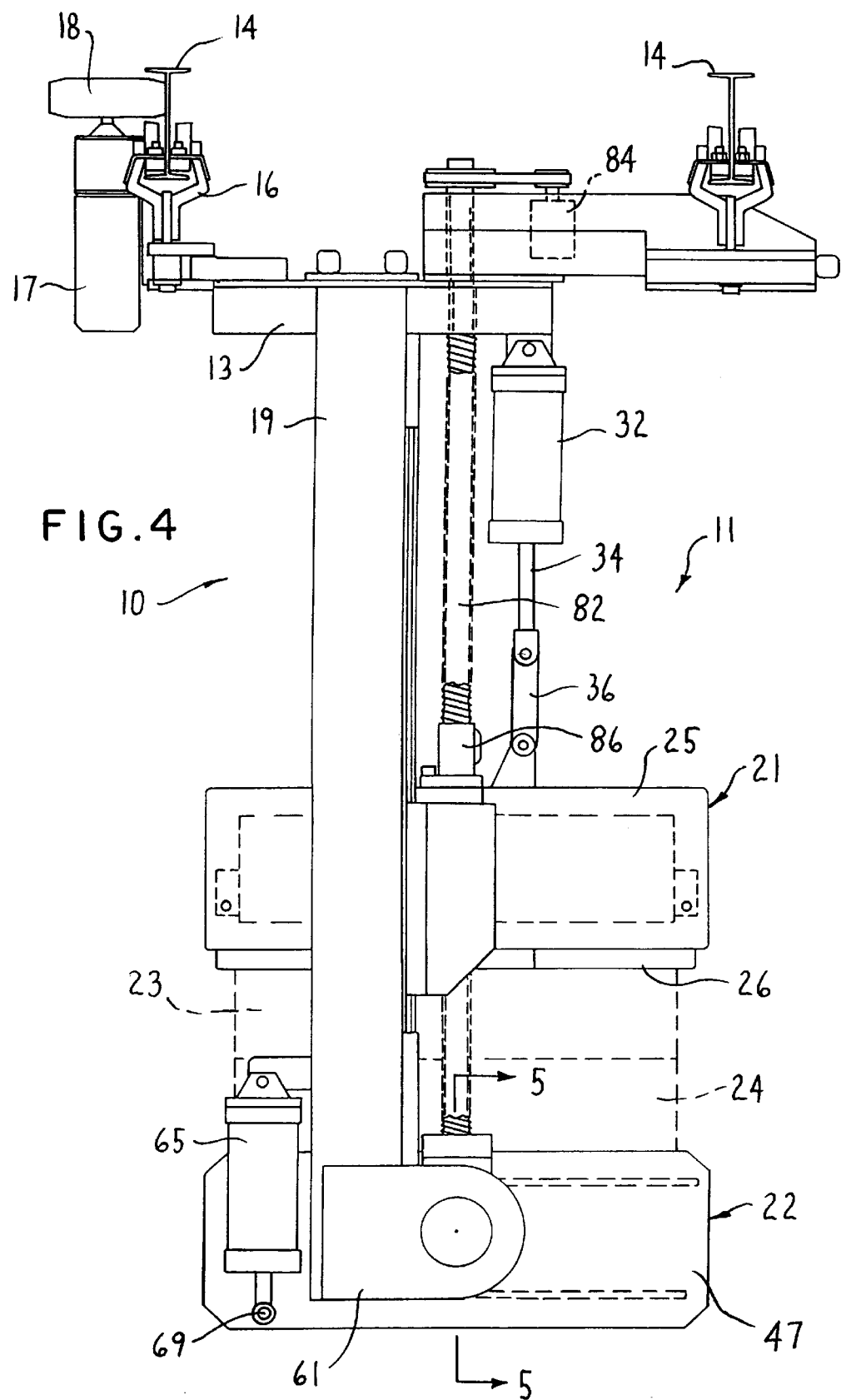
FIG. 4 is an end elevational view of the press substantially in its closed position.

The press 11 is adapted to support thereon a mold which typically includes a top mold part 23 which is fixedly supported on and projects downwardly from the upper press structure 21, and a bottom mold part 24 which is fixedly supported on and projects upwardly from the bottom press structure 22. The top and bottom mold parts 23 and 24 are disposed in vertically aligned relation when the mold is in a closed relationship as illustrated by FIG. 4, and they respectively define thereon opposed mold cavity walls which cooperate to define a mold cavity for forming the desired part when the top and bottom mold parts have been relatively moved into a closed engaged relation as diagrammatically illustrated by FIG. 4. The construction of the mold parts is conventional, and is designed in accordance with the specific part being molded, whereby further description thereof is believed unnecessary.

Figure 2:
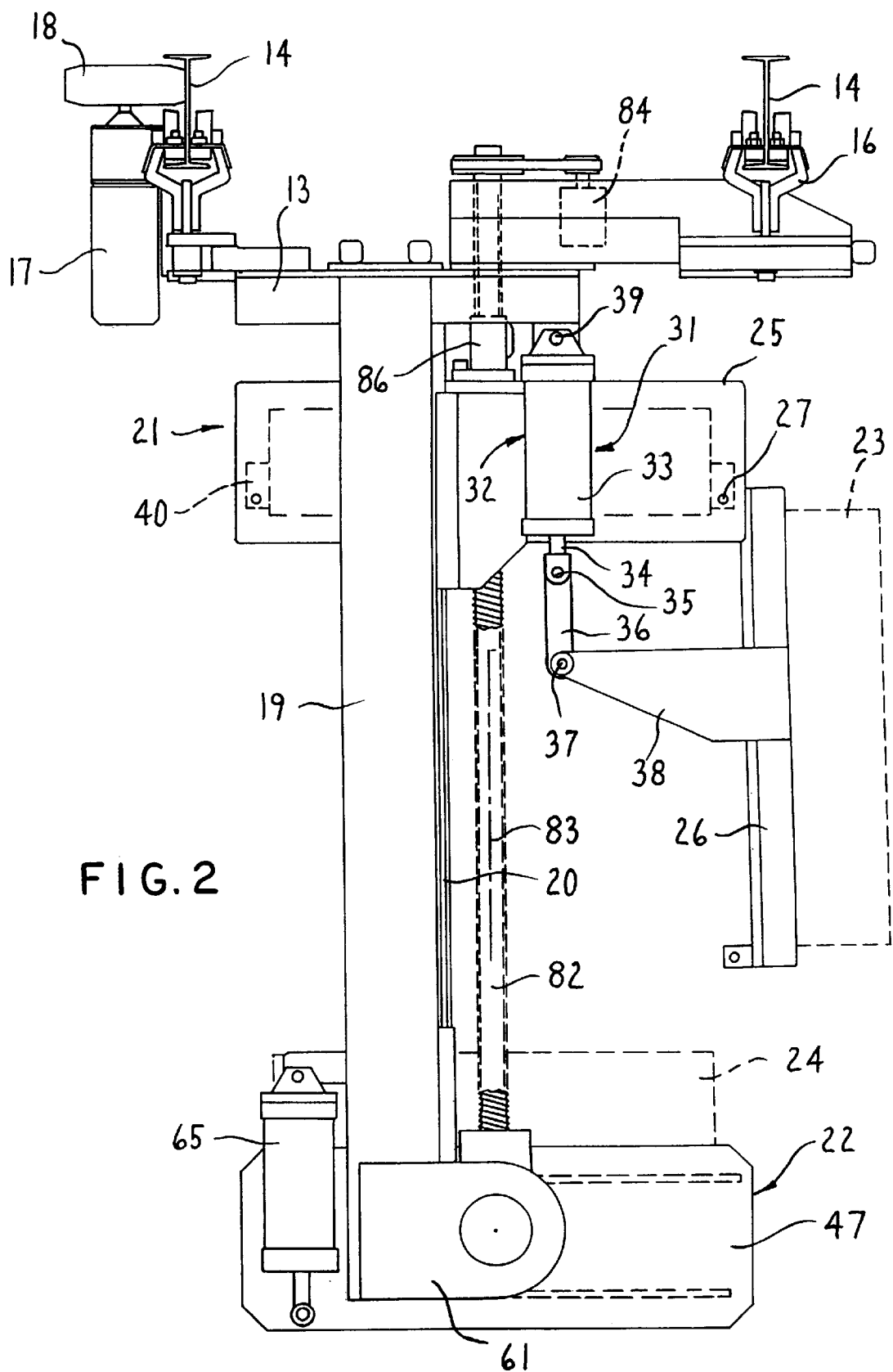
FIG. 2 is an end elevational view of the press as appearing in FIG. 1.

The top press structure 21 includes a top press support 25 which extends transversely between the frame posts 19 and is vertically slidably supported thereon. The top press structure 21 also preferably includes a top press plate 26 which is positioned under the top press support 25 and defines thereon, in the normal operating position of the press, a generally horizontally enlarged and downwardly facing surface to which the upper mold art 23 is fixedly secured. This top press plate 26, often referred to as a booking plate, is secured along one longitudinally extending side edge thereof to the top press support 25 by a hinge structure 27 which defines a generally horizontally extending hinge axis, the latter extending generally in the longitudinal direction of the carrier and being disposed adjacent one side thereof. The hinge structure 27 permits the top booking plate 26 and the top mold part 23 mounted thereon to be vertically swung downwardly through an angle approaching 90° so that the top booking plate is suspended generally vertically downwardly between the end frames 19 adjacent one side of the carrier, substantially as illustrated by FIGS. 1 and 2. When in this downwardly suspended position, the upper mold part 23 is positioned so that the mold cavity thereof can be readily accessed by a worker standing adjacent one side of the press to permit performance of the necessary manual operations required relative to the upper mold part.

Figure 3:
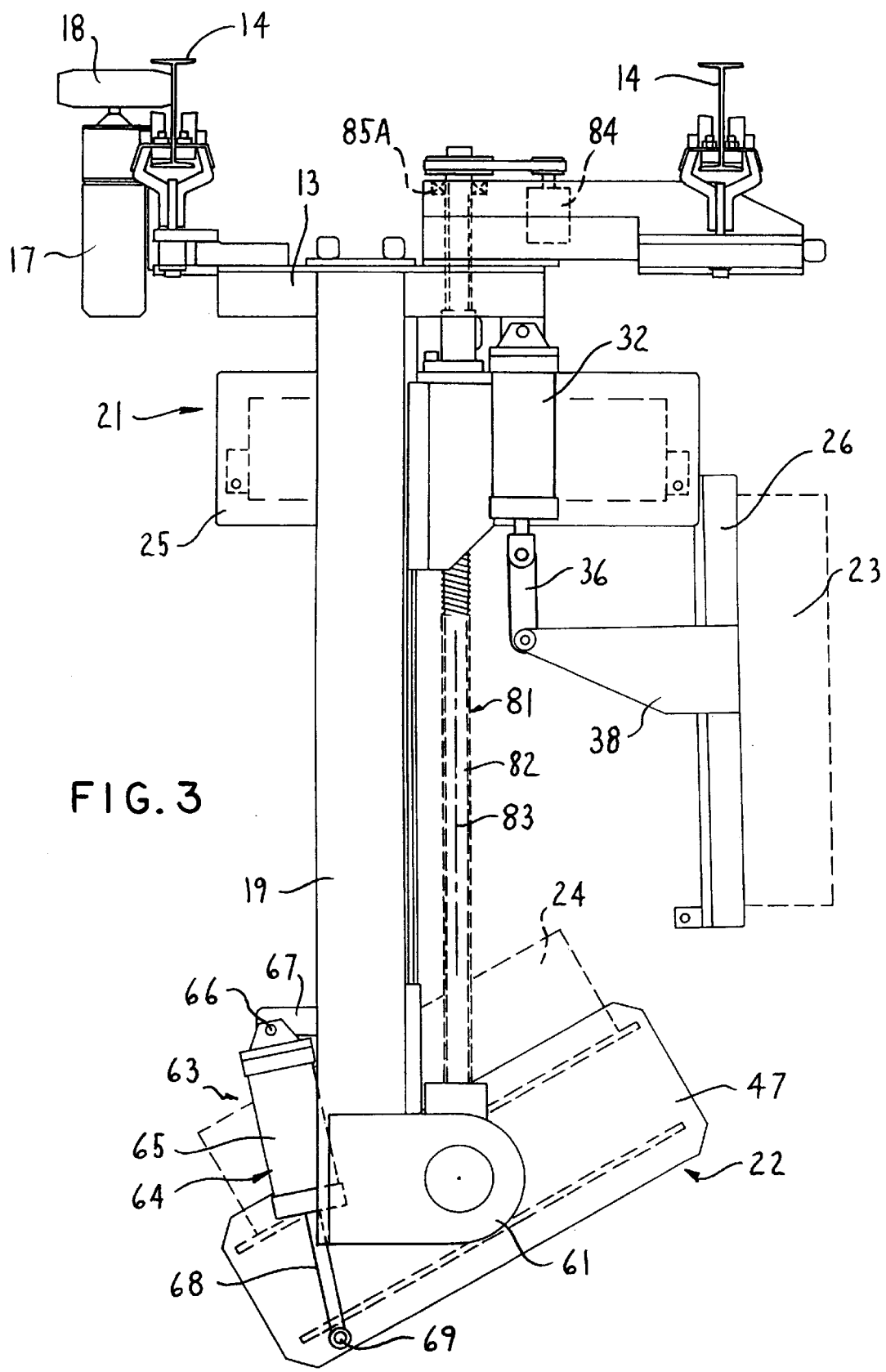
FIG. 3 is an end elevational view similar to FIG. 2 but also illustrating the lower press platen tilted into its side access position.

To effect movement of the top booking plate 26 between the upper and generally horizontal molding position shown in FIG. 4, and the vertically suspended access position shown in FIG. 3, an activating mechanism 31 is provided for effecting movement of the top booking plate 26 between the positions shown in FIGS. 3 and 4. This control mechanism 31 includes a fluid pressure cylinder (i.e. an air cylinder) 32 whose housing 33 is supported at its upper end from the top frame by a hinge 39. A conventional cylinder rod 34 projects downwardly from the cylinder housing 33 and at its lower end is connected by a hinge 35 to an elongate control link 36, the latter at its opposite end being connected by a hinge 37 to an arm 38 which is fixed to the booking plate 26. The lowermost chamber of the pressure cylinder 32 is constantly supplied with pressurized air so as to always tend to urge the piston rod 34 upwardly into a retracted position, substantially as shown in FIG. 3, in which position the booking plate is maintained in its open access position whenever the upper press structure 21 is in its raised open position. Movement of the upper press structure 21 downwardly toward the closed position, however, causes the upper booking plate 26 to automatically swing upwardly about the hinge 27 into a horizontal position wherein it seats on the underside of the top press support 25. Appropriate automatically activated latches 40 are typically provided on the edge of the top press support 25 for locking the booking plate 26 in the horizontal position.

The activating mechanism 31 for causing automatic swinging of the booking plate 26 to and from its sideward access position in response to vertical displacement of the supporting press structure 25 is described in copending Ser. No. 09/039 920, also owned by the Assignee hereof. The disclosure of this latter copending application is, in its entirety, incorporated herein by reference.

Figure 5:
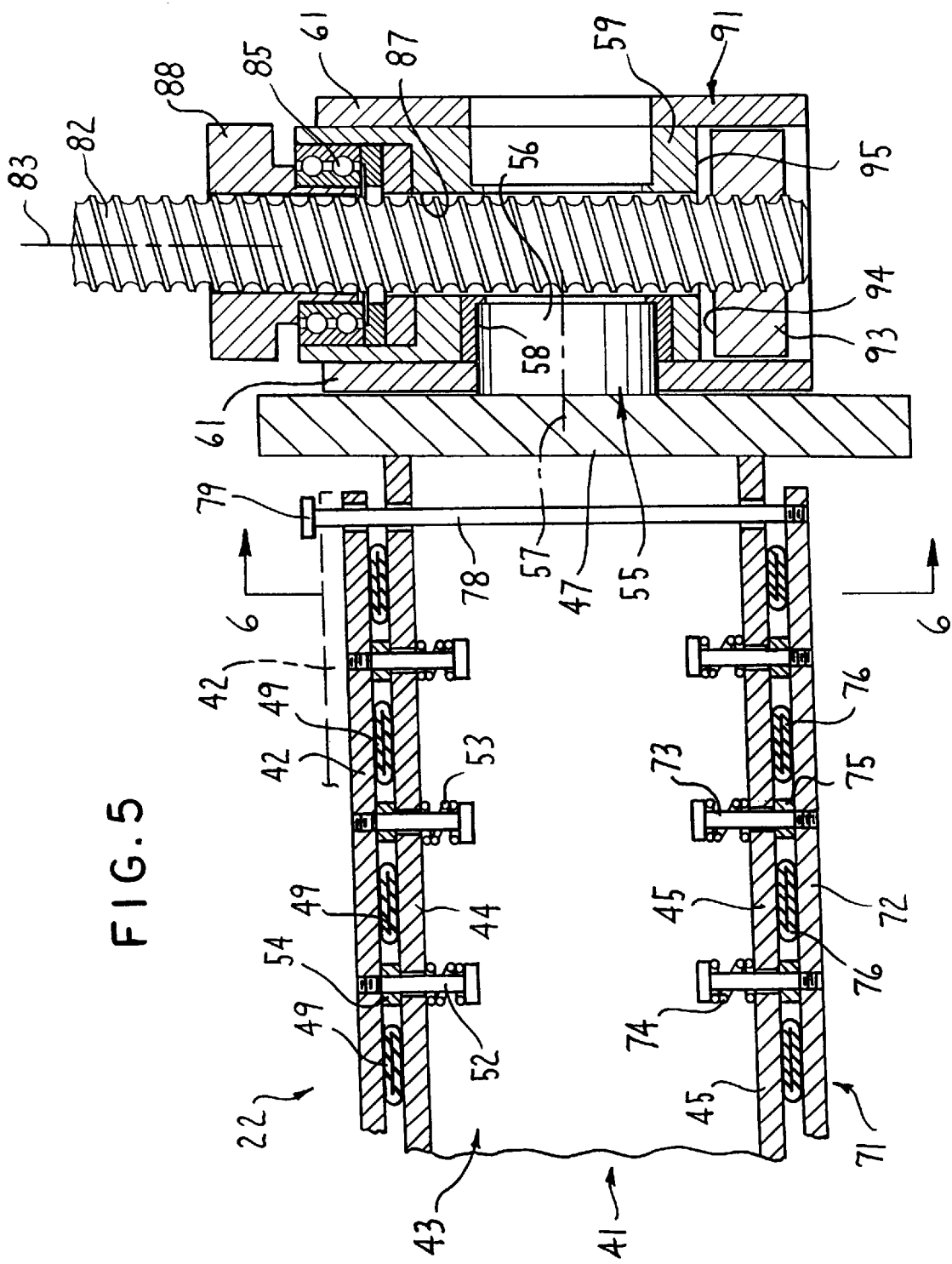
FIG. 5 is an enlarged fragmentary sectional view taken generally along line 5—5 in FIG. 4.
Figure 6:
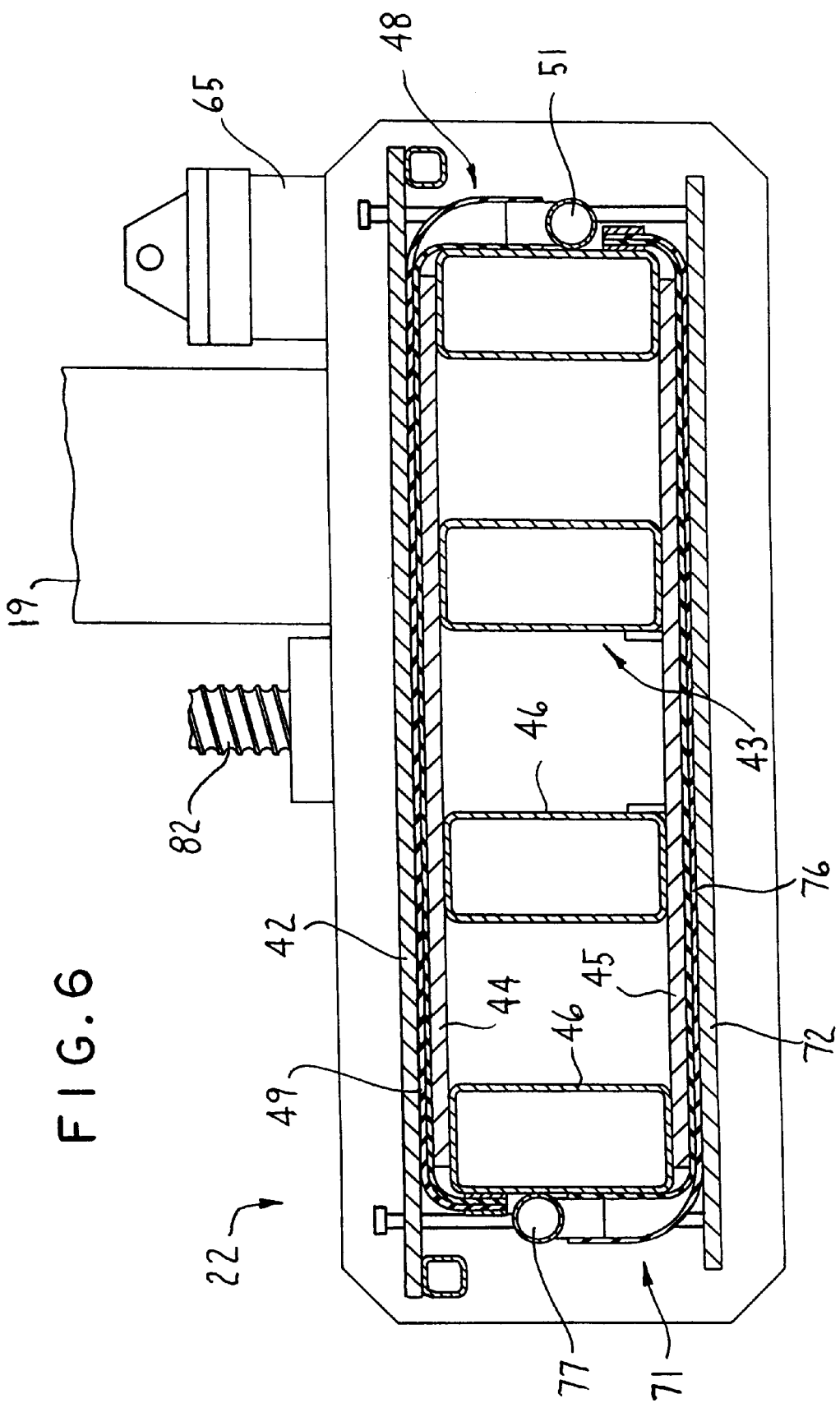
FIG. 6 is a fragmentary sectional view taken generally along line 6—6 in FIG. 5.

The bottom press structure 22 as shown in FIGS. 5 and 6 also includes a horizontally enlarged bottom press plate 42 (often referred to as the bottom booking plate), the latter defining thereon a horizontally enlarged upper surface on which the bottom mold part 24 is fixedly positioned. This bottom booking plate 42 is supported above and on a bottom press support 41, the latter being supported on and extending horizontally between the lower ends of the frame posts 19.

The bottom press support 41 includes a main structural support 43 defined by generally parallel and horizontally enlarged top and bottom support plates 44 and 45, respectively, the latter being rigidly joined together by a plurality of intermediate support channels 46. Opposite ends of the top and bottom plates 44 and 45 are in turn rigidly joined to vertical end plates 47, the latter being positioned inwardly of but in close proximity to the respective end posts 19.

The bottom booking plate 42 is supported on the main support 43 for limited vertical displacement, and for this purpose a lifting device 48 cooperates between the main support 43 and the bottom booking plate 42 for controlling vertical raising and lowering of the latter. This lifting device 48, which in use functions for effecting final mold closure, includes a plurality of inflating devices 49, such as flexible air hoses, positioned in interposed relation between the bottom booking plate 42 and the top support plate 44. These hoses 49 extend transversely of the plates 42, 44 in the region therebetween, and are closed at one end, and are connected to an air supply conduit 51 at the other end, the latter being connectable to a suitable source of pressurized air.

The bottom booking plate 42 has a plurality of pins 52 secured thereto and projecting downwardly therefrom so as to slidably project through the top plate 44. These pins 42 at the lower ends thereof are provided with enlarged heads, and springs 53 surround the pins 52 and coact between the enlarged heads and the underside of the top plate 44 to normally urge the bottom booking plate 42 downwardly into a seated position which is determined by spacers 54 positioned between the plates 42 and 44. These spacers maintain a minimal clearance between these latter plates to accommodate the air hoses 49 therebetween when the air hoses are deflated.

The bottom press structure 22 is supported on and between the lower ends of the frame posts 19 by means of a swivel arrangement 55 which cooperates between the frame posts 19 and the main support 43. This swivel arrangement 55 includes a pair of hubs 56 which are fixed to and project outwardly in generally aligned relation from the opposite end plates 47 so as to define a generally horizontal pivot or swivel axis 57. The hubs 56 project into and are rotatably supported within bearing sleeves 58 which in turn are secured to support blocks 59. Each support block 59 in turn is fixedly secured between a pair of side plates 61, the latter in turn being fixedly secured to and projecting generally transversely relative to the respective end posts 19 adjacent the lower free end thereof. This swivel arrangement 55 enables the lower press structure 22, in its entirety, to be pivotally displaced relative to the frame about the horizontal swivel axis 57 so that the lower press structure can be moved into a sidewardly inclined position substantially as illustrated in FIG. 3 so as to facilitate sideward access to the lower mold part 24. This sideward access position, in the illustrated embodiment, is preferably disposed at an angle of about 20 to about 45 degrees relative to the horizontal.

The sideward tilting of the lower press structure 22 is controlled by a tilt actuator 63 which, in the illustrated embodiment, comprises a fluid (i.e. air) pressure cylinder 64 whose housing 65 is connected at its upper end by a hinge 66 to a bracket 67 which is fixed to and projects transversely from the respective frame post 19. A piston rod 68 projects outwardly of and is extendible from the lower end of cylinder housing 65, and the outer (i.e. lower) free end of the piston rod 68 has a connecting pin 69 thereon which couples to the main support 43 so as to permit tilting of the lower press structure 22 from the horizontal molding position of FIG. 2 into the sideward access position of FIG. 3 when the cylinder 64 is energized so as to extend the piston rod 68 downwardly.

The lower press structure 22 also has, as an option, a mold opening assist mechanism 71 (FIGS. 5 and 6) associated therewith. This latter mechanism includes a generally horizontally enlarged actuator plate 72 which is disposed adjacent and is vertically movable through a limited extent relative to the bottom plate 45. For this purpose, the actuator plate 72 has a plurality of pins 73 secured thereto and projecting upwardly through the bottom plate 45, which pins have enlarged upper ends. Springs 74 surround the pins and cooperate between the enlarged heads thereof and the upper surface of the bottom plate 45 so as to normally urge the actuator plate 72 upwardly into a raised position wherein it abuts spacers 75 which in turn abut the underside of the bottom plate 45. In the clearance space defined between the plates 45 and 72, due to the presence of the spacer 75 therebetween, a plurality of actuators formed as elongate inflatable air hoses 76 are disposed so as to extend transversely across the actuator plate 72. These air hoses 76 are closed at one end, and at the other end are connected to a suitable supply conduit 77, the latter in turn being connected to a source of pressurized air.

The mold opening or actuator plate 72 also has a plurality of elongate connector pins 78 fixed thereto and projecting upwardly therefrom. These latter pins 78 freely pass upwardly through all of the other plates and in fact pass upwardly through openings formed in the bottom booking plate 42 so as to terminate in enlarged heads 79 which are normally spaced upwardly a selected distance above the bottom booking plate 42 when the latter is in its lowered position, and also when the bottom booking plate 42 is in its normally raised position as illustrated by dotted lines in FIG. 5.

With the arrangement as described above, and assuming that the upper air hoses 49 are inflated so that the bottom booking plate 42 is raised to provide a closing force between the upper and lower mold parts, then inflation of the lower air hoses 76 (either simultaneous with or subsequent to deflation of the upper air hoses 49) causes the enlarged heads 79 of the pins 78 to engage the bottom booking plate 42 and exert a downward mold opening force thereon in response to downward displacement of the actuator plate 72 due to inflation of the lower air hoses 76.

As an alternative, the pins 73 and springs 74 (FIG. 5) as associated with the actuator plate 72 can be deleted, and in place thereof the elongate connector rods 78 can have the upper and lower ends thereof respectively fixedly connected to the booking plate 42 and actuator plate 72. With this fixed connection between the plates 42 and 72, the actuator plate 72 will normally be maintained downwardly a greater vertical spacing below the bottom plate 45 when the booking plate 42 is in the nonactivated position shown in FIG. 5 so that when the air bags 49 are activated, both plates 42 and 72 will be vertically lifted simultaneously. In such situation, if an assist is necessary to crack open the mold following the molding operation, then the lower air bags 76 are energized simultaneous with or following de-energization of the top air bags 49 so that the actuator plate 72 acting through rods 78 exerts a downward force on the booking plate 42.

To effect closing and opening of the press, which respectively requires downward and upward displacement of the top press structure 21, the press arrangement 11 includes a pair of screw-type drive units 81 which are disposed adjacent opposite sides of the frame and provide a driving connection between the frame and the upper press structure 21 to effect desired vertical movement of the latter. The pair of screw-type drive units 81 in the preferred embodiment are identical, one being positioned in close proximity to each of the frame posts 19 so as to extend generally parallel therewith, and thus only one of the screw-type drive units will hereinafter be described.

The screw-type drive unit 81 is preferably a ball-screw drive and includes a vertically elongate drive shaft 82 which is disposed adjacent and generally parallel with the respective frame posts 19 so that the axis 83 of the shaft extends generally vertically. The shaft 82 is drivingly connected at its upper end to a drive motor 84 which is carried on the top frame 13. The drive motor 84 is typically a high speed electric motor which is drivingly connected in a conventional manner through a speed reducer or other drive transmitting device, such as a belt drive, to the upper end of the drive shaft 82. The drive motor 84 is of conventional construction and possesses its own internal brake which activates to prevent rotation of the drive motor shaft whenever the drive motor is de-energized. While each drive unit 81 may be provided with its own drive motor, it is also feasible to provide a single drive motor for both drive units. Preferably each drive unit has its own drive motor, but the two drive shafts are drivingly connected through a timing belt or the like to ensure synchronization of driving thereof. These latter variations are disclosed in copending U.S. application Ser. No. 09/041 068, and further description thereof is believed unnecessary.

The drive shaft 82 has the lower end portion thereof disposed so as to extend through an opening 87 which projects vertically through the support block 59, with the lower end of the drive shaft being rotatably supported thereon by a conventional anti-friction bearing 85. The upper end of the drive shaft 82 similarly projects through a frame member associated with the top frame 13 and is also appropriately rotatably supported by means of an anti-friction bearing 85A, such being conventional and well understood. The drive shaft 82, adjacent the lower end thereof, has a stop collar 88 fixedly mounted thereon which under normal operation is adapted to abut against the upper end of the inner race of the lower bearing 85 to maintain a normal vertical position of the drive shaft 82, although the upper and lower bearings which support the drive shaft 82 do permit limited upward axial displacement of the drive shaft 82 for a purpose as described hereinafter.

The elongate intermediate portion of the drive shaft 82 is externally threaded and cooperates with a rotatable ball-nut unit 86 which surrounds the screw portion of the drive shaft. This ball-nut unit 86 incorporates therein a plurality of balls (not shown) which cooperate in a rolling and recirculating manner with the screw portion of the drive shaft 82 in response to relative rotation between the nut 86 and the drive shaft 82, such ball-nut-screw drives and their construction being conventional and well understood.

The housing of the ball-nut unit 86 is fixed to the top press support 25 associated with the top press structure 21 so that the latter is vertically displaced upwardly or downwardly along with the ball-nut units 86 in response to rotation of the drive shafts 82, depending upon the direction of rotation of the latter.

To provide a positive braking of the drive shafts 82 independent of the brakes associated with the driving motors therefor, the drive shaft 82 of each drive unit 81 has a friction brake 91 (FIG. 5) which cooperates between the lower end of the drive shaft 82 and the frame of the press. This friction brake 91 includes an annular brake plate 93 which is fixed to the respective drive shaft 82 adjacent the lower free end thereof, whereby this brake plate 93 is disposed closely adjacent and substantially directly under the support block 59. The brake plate defines thereon a substantially flat upper brake surface 94 which is normally disposed in opposed but slightly axially spaced relation (typically between about 0.020 and about 0.040 inch) from a substantially planar lower brake surface 95 as defined on the lower end of the support block 59. These opposed brake surfaces 94 and 95 are conventional friction brake surfaces, and during normal rotation of the drive shaft 82 are spaced from one another in non-engaged relation. However, when the drive shaft 82 is displaced axially upwardly a small extent, as explained hereinafter, the brake plate 93 is moved upwardly so that the upper brake surface 94 thereon engages the lower brake surface 95 provided on the stationary support block 59, thereby creating a frictional braking engagement between the opposed surfaces 94–95 to provide a positive restraint against rotation of the drive shaft 82.

The operation of the press 11 will now be briefly described.

In the following description of a typical operational cycle of the press arrangement 11, it will be assumed that the press is initially in its open position wherein the upper press structure 21 is in its raised or uppermost position, and that the upper and lower booking plates 26 and 42 are angled sidewardly into their access positions, substantially as illustrated in FIG. 3. In this latter position the booking plates are angled so as to face sidewardly toward opposite sides of the press, whereby workers positioned adjacent opposite sides can respectively access the upper and lower mold parts 23–24 to carry out whatever operations are required with respect to preparing the mold. The press cycle is then activated by supplying air to the bottom of the tilt cylinder 64 so as to cause the piston rod 68 to be pulled upwardly, thereby causing the bottom press structure 22 to be pivotally displaced so as to return to its substantially horizontally oriented position as illustrated by FIG. 2. This latter position can be determined by appropriate stops (not shown) associated either with the frame or the pressure cylinder, and in addition appropriate latches (not shown) can optionally be provided and activated so as to latch the lower press structure in this horizontal orientation if desired.

With the lower press structure 22 in its horizontal orientation so that the lower mold part 24 is oriented with its cavity projecting generally upwardly, then if the press involves an open pour, a predetermined quantity of plastics material, particularly polyurethane, is poured or injected into the mold cavity of the lower mold part. While an open pour technique is conventionally utilized, it will be appreciated that in some situations the polyurethane is injected into the mold cavity when the press is closed.

Subsequent to or simultaneous with the movement of the lower press structure 22 into its horizontal orientation, the upper press structure 21 is activated so as to move downwardly toward the closing position of the mold. For this purpose the motors 84 of the drive units 81 are energized, causing the internal motor brakes to release, and causing synchronous rotation of the drive shafts 82. These rotating shafts 82 react with the ball-nut units 86 and hence cause the top main support 25 to be slidably displaced downwardly away from its uppermost position. During this downward displacement of the top press support 25, pressurized air acts upwardly against the piston of the pressure cylinder 32 so that as the top press support 25 is moved downwardly carrying with it the hinge 27, the control link 36 and cylinder rod 34 are urged upwardly due to the internal pressure in the cylinder 32, thereby causing the top booking plate 26 to swing upwardly (clockwise in FIGS. 2 and 3) about the hinge 27. The top booking plate 26 continues to swing upwardly synchronously with the downward displacement of the top press support 25 until the top booking plate 26 is disposed substantially horizontally and seats against the top press support 25, at which time the latches 40 will be automatically activated. This now results in the upper mold part 23 being generally vertically aligned with but spaced upwardly from the lower mold part 24.

The drive units 81 remain energized so that the continued rotation of drive shafts 82 causes the entire upper press structure 21 to move downwardly toward the lower mold part, and during this continued downward movement the cylinder rod 34 due to its connection to the top booking plate is extended downwardly in opposition to the internal cylinder pressure.

When the upper mold part 23 has been moved downwardly so as to be positioned close to a position of closure with the lower mold part 24, but normally spaced a small distance from such closure, which small distance will typically be in the order of about 0.100 inch or less, the drive units 81 are de-energized and the internal brakes associated with the drive motors 84 are automatically applied. The stoppage of the top press structure 21 can be readily controlled by appropriate programming of the overall drive system or by appropriate position sensors, such being conventional.

After stoppage of the upper mold part 23 in very close positional relationship to the lower mold part 24, pressurized air is supplied to the air hoses 49 which cause the bottom press plate 42 to be lifted upwardly away from the bottom press support 43 whereby the lower mold part 23 is lifted upwardly to effect a full closing engagement with the upper mold part 24. The inflation of the air hoses 49 is also of sufficient magnitude to cause the lower mold part 23 to exert a significant closure force against the upper mold part 24 so as to permit the mold parts to be maintained fully closed during the molding process which takes place within the mold. This imposition of a high closure force from the lower mold part to the upper mold part, however, results in this force being applied to the upper press structure 21 and hence to the ball units 86 which react against the screw portions of the drive shafts 82. This upward force as transmitted from the ball-nut units 86 to the screw shafts 82 causes the latter to lift axially upwardly a small extent, as permitted by the top and bottom bearings 84 and 84A, thereby causing the friction brake plates 93 at the lower ends of the drive shafts to also be lifted upwardly so that the upper brake surfaces 94 move into frictional engagement with the stationary lower brake surfaces 95 defined on the support blocks 59. This thus effectively prevents the shafts 82 from rotating, and hence the continued imposition of the upward force on the upper mold part, and the transmission of this force to the drive shafts, is thus ineffective in causing reverse driving (i.e. reverse rotation) of the drive shafts due to their coaction with the ball-nut units.

Once the molding cycle has been completed, then the air hoses 49 are de-energized and, in some situations, this release of the upwardly directed force on the lower mold part is sufficient to effect release between the mold parts, thereby enabling the lower mold part to move downwardly out of engagement with the upper mold part. At the same time, the release of the upward force from the upper mold part enables the upper press structure 21 and the drive shafts 82 to move downwardly a small extent due to the urging of gravity, thus causing a separation between the brake surfaces 94 and 95, with the limited downward movement being controlled by the stop collars 88 re-engaging the bearings.

In many situations, however, the magnitude of the force applied to effecting closure of the mold parts is such as to cause the mold parts to become tightly adhered together, and thus the mere release of the upward mold closure force may be incapable of effecting cracking or separating of the upper and lower mold parts. In such situation, when the press is equipped with the optional mold release assist mechanism 71, the lower air hoses 76 can be inflated substantially simultaneously with the deflation of the upper air hoses 49. The inflation of the lower air hoses 76 forcibly drives the actuator plate 72 downwardly which, acting through the pins 78, cause the enlarged heads 79 of the pins 78 to engage the bottom booking plate 42. A downwardly directed opening or cracking force is thus imposed on the bottom booking plate 42, and on the lower mold part 24 attached thereto, so as to effect opening or cracking of the lower mold part 24 from the upper mold part 23. Once this has been accomplished, then the lower air hoses 76 are also de-energized.

With the upper and lower mold parts cracked or opened, then the drive motors 84 are energized to cause reverse rotational driving of the drive shafts 82 so that the upper press structure 21 is quickly moved upwardly away from the mold closure position. During the initial upward movement, the pressure in the cylinder 32 causes the cylinder rod 34 to be retracted through its maximum extent. Thereafter continued upward movement of the upper press structure 25 causes the upper booking plate 26 to swing sidewardly (counterclockwise) about the hinge 27 so as to cause the top booking plate to swing into its full sideward access position wherein it is substantially vertically suspended simultaneous with the continued upward displacement of the top press support 25 into its uppermost open position, substantially as illustrated in FIG. 3.

Simultaneous with or subsequent to the upward opening movement of the top press structure, the lower press structure is sidewardly tilted by applying fluid pressure to the upper end of the pressure cylinder 64 so that the piston rod 68 is extended downwardly to cause the lower press structure to be sidewardly tilted into its side access position as illustrated by FIG. 3. This also enables the molded workpiece to be readily removed from the mold cavity associated with the lower mold part.

The molding cycle has now been completed, and the press is again in its open and access position so as to permit initiation of a new molding cycle.

With the press 11 of the present invention, when it is mounted on and associated with a mobile overhead carrier 10, the carrier and press can be moved sequentially along a closed path into and through a plurality of workstations, whereby various operations can be carried out at sequential workstations disposed along the closed work path. This thus enables the mold operation when the mold is closed to take place as the carrier is moving between two adjacent workstations. At the same time, electricity can be supplied to the carrier and to the press from an overhead arrangement such as is conventional, and the press can be automatically coupled to a supply of compressed air when it is disposed in a desired working station.

As an alternative, it will be appreciated that the press and its frame can be disposed in a stationary arrangement on a support floor, and all of the operational relationships are still substantially the same with respect to the basic molding cycle.

For further detail with respect to a rim press employing screw-type drive arrangements, and the general type of molding operation carried out in such press, attention is directed to aforementioned copending U.S. Ser. No. 09/041 068, the entire disclosure of which is incorporated herein by reference.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A press for molding an element in a mold defined by upper and lower mold parts which when closed cooperate to define a mold cavity therebetween, said press comprising a frame, an upper platen arrangement mounted on the frame and defining thereon a horizontally enlarged and downwardly facing press surface on which the upper mold part is mounted, a lower platen arrangement defining thereon a horizontally enlarged and upwardly facing press surface on which the lower mold part is mounted, at least one of said platen arrangements being vertically movable toward and away from the other platen arrangement for movement between respective closed and open positions of the mold, at least a pair of vertically elongated and parallel drive shaft units drivingly connected to said one platen arrangement for effecting movement thereof between said open and closed positions, each said draft shaft unit comprising a vertically elongate screw shaft which extends vertically and is rotatably supported relative to the upper and lower platen arrangements and which is rotatably engaged with a nut member which surrounds the screw shaft and is mounted on said one platen arrangement, a drive mechanism connected to said screw shafts for effecting simultaneous and synchronous rotation thereof, a mold closing device provided on said other platen arrangement for permitting limited vertical displacement of the mold part of said other platen arrangement relative to a portion of said other platen arrangement, said closing device displacing said last-mentioned mold part vertically toward and into closing engagement with the opposed mold part and imposing a vertically oriented closing force on the latter, said drive shafts being mounted on said frame for at least limited vertical displacement in response to said closing force generated by said mold closing device, and a friction brake arrangement cooperating with said drive shafts and being moved into frictional braking engagement to prevent rotation of said screw shafts in response to vertical displacement of the screw shafts responsive to said closing force.

2. A press according to claim 1, wherein said nut members are recirculating ball-nut units which are mounted on said upper platen arrangement and cooperate with the drive shafts to effect closing and opening movement of the upper platen arrangement in downward and upward directions respectively, and wherein said mold closing device is mounted on said lower platen arrangement and effects upward lifting of a bottom booking plate which mounts the lower mold part thereon to cause the lower mold part to be lifted into a closed engaged position with respect to the upper mold part and to impose an upwardly directed closing force on the latter.

3. A press according to claim 2, wherein the lower platen arrangement is supported for pivoting movement about a horizontal axis for pivoting movement between a horizontal orientation and a generally sidewardly angled orientation which facilitates access to the lower mold part.

4. A press according to claim 2, wherein the upper platen arrangement includes a top booking plate which mounts the upper mold part thereon and which is swingable sidewardly about a horizontal axis into an access position to facilitate access to the upper mold part when the upper platen arrangement is in a raised open position.

5. A press according to claim 4, wherein the lower platen arrangement is supported for pivoting movement about a horizontal axis for pivoting movement between a horizontal orientation and a generally sidewardly angled orientation which facilitates access to the lower mold part.

6. A press according to claim 2, including a mold cracking assist mechanism provided on said lower platen arrangement for imposing a downwardly directed opening force on the lower mold part to assist in effecting separation thereof from the upper mold part.

7. A press according to claim 2, wherein the mold closing device comprises a first inflatable fluid pressure device which is mounted on said lower platen arrangement and when inflated effects upward vertical displacement of a bottom booking plate which mounts the lower mold part thereon to cause the lower mold part to be lifted into a closed engaged position with respect to the opposed upper mold part and for imposing an upwardly directed closing force on the upper mold part, and a mold cracking assist mechanism mounted on said lower platen arrangement for imposing a downwardly directed opening force on the lower mold part to assist in effecting separation thereof from the upper mold part, said cracking assist mechanism comprising a second inflatable fluid pressure device which is mounted on the lower platen arrangement and when inflated imposes a downwardly directed opening force on the bottom booking plate to effect separation of the lower mold part from the upper mold part.

8. A press according to claim 2, wherein the friction brake arrangement includes a brake member fixedly secured to each said screw shaft and defining thereon a first brake surface which is normally axially spaced a small distance from an opposed second brake surface which is stationarily mounted with respect to the frame, said first and second brake surfaces being transversely oriented relative to an axis defined by the respective said screw shaft, whereby downward axial displacement of the screw shaft causes the first brake surface to frictionally engage the second brake surface.

9. A press according to claim 8, wherein the normal spacing axially between the first and second brake surface is a maximum of 0.040 inch.

10. A press according to claim 2, wherein said friction brake arrangement includes a brake member disposed adjacent a lower end of each said screw shaft, said closing force imposed on said upper mold part by said closing device is transferred to said upper platen arrangement and the associated said ball-nut units which react against the respective said screw shafts and lift same axially upwardly to frictionally engage said brake members and prevent rotation of said screw shafts.

11. A press for molding an element in a mold defined by upper and lower mold parts which when closed cooperate to define a mold cavity therebetween, said press comprising a frame, an upper platen arrangement mounted on the frame and defining thereon a horizontally enlarged and downwardly facing press surface on which the upper mold part is mounted, a lower platen arrangement defining thereon a horizontally enlarged and upwardly facing press surface on which the lower mold part is mounted, at least one of said platen arrangements being vertically movable toward and away from the other platen arrangement for movement between respective closed and open positions of the mold, a drive unit drivingly connected to at least said one platen arrangement for effecting movement thereof between said open and closed positions, a mold closing device provided on a first said platen arrangement for permitting limited vertical displacement of the mold part of said first platen arrangement for displacing said last-mentioned mold part vertically toward and into closing engagement with the opposed mold part and for holding said opposed mold parts closed with a closure force, said mold closing device comprising a first gas inflatable and flexible pressure device which is mounted on said first platen arrangement and which when pressurized expands to effect vertical displacement of a booking plate which mounts the respective mold part thereon to cause the respective mold part to be vertically displaced into a closed engaged position with respect to the opposed mold part and for imposing a vertically directed closing force on the latter, and a mold cracking assist mechanism provided on said first platen arrangement, said cracking assist mechanism comprising a second gas inflatable and flexible pressure device which is mounted on said first platen arrangement and which when pressurized expands to impose a vertically directed opening force on the respective mold part to assist in effecting separation thereof from the opposed mold part.

12. A press according to claim 11, wherein said cracking assist mechanism is separate from said mold closing device, said first and second gas inflatable pressure devices are expandable and flexible hoses.

13. A press according to claim 11 wherein said first and second inflatable pressure devices when pressurized expand vertically to respectively impose a vertically upwardly directed closing force and a vertically downwardly directed opening force on the respective mold part.

14. A press for molding an element in a mold defined by upper and lower mold parts which when closed cooperate to define a mold cavity therebetween, said press comprising a frame, an upper platen arrangement mounted on said frame and defining thereon a horizontally enlarged and downwardly facing press surface on which said upper mold part is mounted, a lower platen arrangement defining thereon a horizontally enlarged and upwardly facing press surface on which said lower mold part is mounted, one of said platen arrangements being vertically movable toward and away from the other said platen arrangement for movement between respective closed and open positions of the mold, a pair of vertically elongated drive shaft units drivingly connected to said one platen arrangement for effecting movement thereof between said open and closed positions, each said drive shaft unit comprising an elongate screw shaft which extends vertically and is rotatably supported relative to said upper and lower platen arrangements and which is rotatably engaged with a nut member which surrounds said screw shaft and is mounted on said one platen arrangement, a drive mechanism connected to said screw shafts for effecting rotation thereof, and a cracking mechanism including a flexible and inflatable member provided on a first said platen arrangement which when inflated expands and imposes a vertically-directed opening force on the mold part of said first platen arrangement to effect separation of the last-mentioned mold part from the opposed mold part.

15. A press according to claim 14 wherein said nut members are mounted on said upper platen arrangement and said lower platen arrangement includes a support member on which an interconnected pair of upper and lower plates are movably mounted, said upper plate defining said upwardly facing press surface thereon, said flexible inflatable member being sandwiched between said lower plate and said support member such that when pressurized said flexible inflatable member displaces said upper and lower plates vertically downwardly relative to said support member and exert a downwardly directed force on said mold part mounted on said upper plate to separate said mold parts from one another.

16. A press according to claim 14 further including a closing mechanism provided on said first platen arrangement for imposing a vertically directed closing force on said mold part mounted on said first platen arrangement to displace same into a closed engaged position relative to the opposed mold part.

17. A press according to claim 14 wherein said nut members are mounted on said upper platen arrangement and cooperate with said screw shafts to effect closing and opening movement of said upper platen arrangement in downward and upward directions, respectively, and said inflatable member is mounted on said lower platen arrangement and when inflated effects a downwardly directed opening force on said lower mold part to effect separation thereof from said upper mold part.

18. A press according to claim 17 wherein said lower platen arrangement includes a support member defining top and bottom horizontally oriented walls which are vertically spaced from one another and a horizontally enlarged bottom press plate positioned in superimposed relation with an upper surface of said top wall and defining said upwardly facing press surface thereon, said cracking mechanism including a horizontally enlarged actuator plate positioned in superimposed relation with a lower surface of said bottom wall and a plurality of elongate rods, said inflatable member being sandwiched between said bottom wall and said actuator plate, each said rod having a first end fixed to said actuator plate and extending upwardly through said bottom and top walls and said press plate and terminating in an enlarged second end, said second ends being vertically spaced from an upper surface of said press plate such that when said inflatable member is pressurized, said second ends of said rods engage said press plate and exert a downwardly directed force thereon in response to downward displacement of said actuator plate relative to said bottom wall.

19. A press according to claim 18 wherein said cracking mechanism includes a plurality of pins, each said pin having a lower end fixed to said actuator plate and extending upwardly through said bottom wall and terminating in an enlarged upper end which is vertically spaced from an upper surface of said bottom wall, and a biasing member is disposed between each said enlarged upper end and an upper surface of said bottom wall to bias said actuator plate upwardly toward said bottom wall.

20. A press according to claim 18 further including a closing mechanism provided on said lower platen arrangement for effecting vertical displacement of said press plate to cause said lower mold part to be vertically displaced into a closed engaged position with respect to said upper mold part and for imposing a vertically directed closing force thereon.

21. A press according to claim 20 wherein said inflatable member is a first pneumatically inflatable member and said closing mechanism includes a second pneumatically inflatable member sandwiched between said press plate and said top wall which when pressurized expands and effects displacement of said press plate and said lower mold part mounted thereon vertically toward said upper mold part and for holding said mold parts closed with a closure force.

22. A press according to claim 21 wherein said cracking mechanism includes a plurality of first pins, each said first pin having a lower end fixed to said actuator plate and extending upwardly through said bottom wall and terminating in an enlarged upper end which is vertically spaced from an upper surface of said bottom wall, and a first biasing member is disposed between each said enlarged upper-end and an upper surface of said bottom wall to bias said actuator plate upwardly toward said bottom wall, and said closing mechanism includes a plurality of second pins, each said second pin having an upper end fixed to said press plate and extending downwardly through said top wall and terminating in an enlarged lower end which is vertically spaced from a lower surface of said top wall, and a second biasing member is disposed between each said enlarged lower end and said lower surface of said top wall to bias said press plate downwardly toward said top wall.

23. A press according to claim 21 wherein said lower platen arrangement is supported for pivoting movement about a horizontal axis for pivoting movement between a horizontal orientation and a sidewardly angled orientation which facilitates access to said lower mold part.

* * * * *